United States Patent Office 3,654,321
Patented Apr. 4, 1972

3,654,321
17α-METHYLENECYCLOPROPYL- AND 17α-SPIRO-PENTYL STEROIDS AND PROCESS
John H. Fried, Palo Alto, Calif., and Pierre Crabbé, Mexico City, Mexico, assignors to Syntex Corporation, Panama, Panama
No Drawing. Filed Aug. 4, 1970, Ser. No. 60,943
Int. Cl. C07c 169/20
U.S. Cl. 260—397.4     19 Claims

ABSTRACT OF THE DISCLOSURE

17α - methylenecyclopropyl and 17α - spiropentyl steroids of the androstane, estrane, and estrogen series which are novel estrogenic, anti-androgenic, progestational, and anti-fertility agents, and a process for the preparation of such compounds.

---

The present invention relates to certain novel cyclopentanopolyhydrophenanthrene derivatives and to a process for making the same.

More particularly, the present invention is directed to the production of certain novel steroids of the androstane, estrane, and estrogen series, substituted at C–17α by a methylenecyclopropyl or a spiropentyl group.

These novel compounds are represented by the following formulas:

wherein
R is hydrogen or methyl;
$R^1$ is hydrogen, methyl or ethyl;
$R^2$ is hydrogen, tetrahydrofuran-2-yl, tetrahydropyran-2-yl, 4-methoxytetrahydropyran-4-yl, or a carboxylic acyl group containing less than 12 carbon atoms;
$R^3$ is hydrogen or a lower alkyl group of 1 to 3 carbon atoms, inclusive;
$R^4$ is a keto group or the group

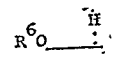

in which $R^6$ is hydrogen, tetrahydrofuran-2-yl, tetrahydropyran-2-yl, 4-methoxytetrahydropyran-4-yl, or a carboxylic acyl group containing less than 12 carbon atoms; and
$R^5$ is hydrogen, lower alkyl of 1 to 8 carbon atoms inclusive, cycloalkyl, tetrahydrofuran-2-yl, tetrahydropyran-2-yl, 4-methoxytetrahydropyran-4-yl, or a carboxylic acyl group containing less than 12 carbon atoms.

The 17α-methylenecyclopropyl grouping can also be designated as 17α - (1′,2′ - methyleneprop - 2′ - en - 1′-yl). The carboxylic acyl groups of the compounds of the present invention contain less than 12 carbon atoms and can be of a straight, branched, cyclic, or cyclic-aliphatic chain structure. This structure can be saturated, unsaturated or aromatic and can be substituted with functional groups such as hydroxy, alkoxy containing up to 5 carbon atoms, acyloxy containing up to 12 carbon atoms, nitro,

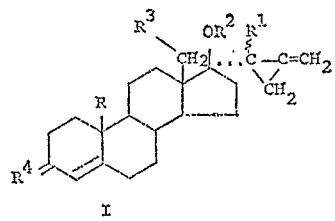

I

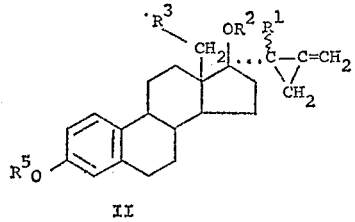

II

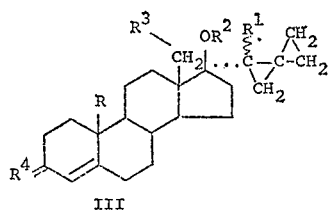

III

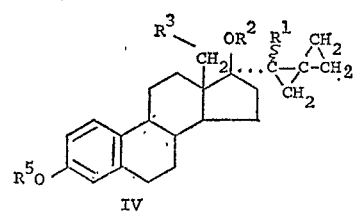

IV

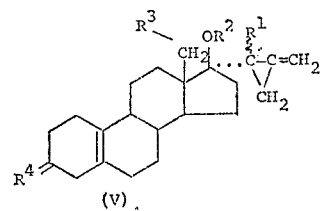

(V)

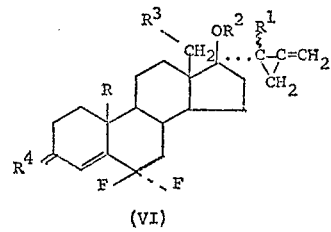

(VI)

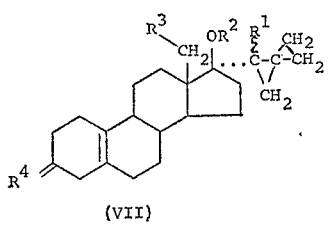

(VII)

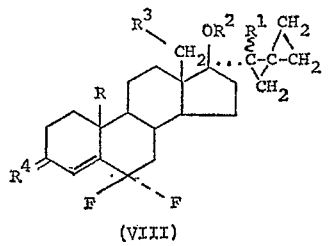

(VIII)

amino, halogeno, and the like. Typical esters include, for example, acetate, propionate, enanthate, benzoate, trimethylacetate, t-butylacetate, phenoxyacetate, cyclopentylpropionate, aminoacetate, β-chloropropionate, adamantoate, dichloroacetate, and the like.

The wavy line (⸲) for the attachment of the $R^1$ group denotes the configurations alpha, beta, and mixtures thereof. The method of the present invention generates both isomers and each and mixtures thereof are included within the scope hereof, hence the use of the wavy line.

The 17α-methylenecyclopropyl and 17α-spiropentyl steroids of Formulas I, III, and V to VIII possess progestational, anti-estrogen, and pituitary inhibition activity and are useful in the treatment of various menstrual disorders and in the control and regulation of fertility. They can be administered in the usual pharmaceutical compositions at dosages appropriate for the condition being treated, in the same manner as known compounds having like utility such as norethisterone.

The novel 17α-methylenecyclopropyl and 17α-spiropentyl steroids of the estrogen series, represented by Formulas II and IV possess estrogenic and antiandrogenic activity and are useful in the treatment of various conditions in which such agents are indicated, such as estrogen deficiencies, menopause, and the like. These compounds can also be used in veterinary medicine in the same manner as known estrogens and in the control and regulation of fertility. In addition, these agents demonstrate antiandrogenic activity and thus are useful in the treatment of acne, benign prostrate hypertrophy and hirsutism in females. They can be administered in the usual pharmaceutical compositions at dosages appropriate for the condition being treated.

The novel process for producing the novel compounds of the present invention comprises treating a 17β-hydroxy-17α-propadienyl (allene)steroid with an iodide of an iodomethyl metal wherein the metal has an oxidation potential of between +0.25 v. and +1.18 v. (see Charles D. Hodgmen, Handbook of Chemistry and Physics, 42nd ed., 1960–61, Chem. Rubber Publishing Co., page 1740) preferably about +0.76 v. such as zinc or chromium, in the absence of alkyl iodides, to thus produce a mixture of the mono- and bismethylene adducts i.e., the 17α-methylenecyclopropyl and 17α-spiropentyl derivatives. In the first instance, the fused methylene (cyclopropyl group) is introduced across the double bond in the allylic position to the hydroxyl group. This process is illustrated by the following partial formulas:

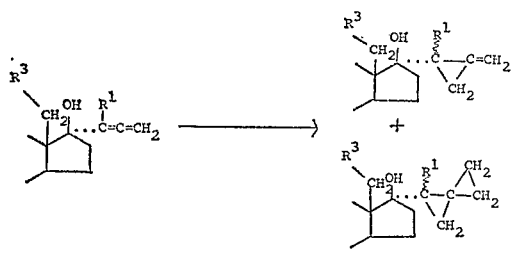

wherein $R^1$, $R^3$, and the wavy line have the above indicated meaning.

The 17α-propadienyl-17β-hydroxy steroids used as starting materials are known compounds. described for example in U.S. Pats. 3,392,165 and 3,392,166. Accordingly, these starting materials are prepared from 17α-dihalocyclopropyl compounds. By one such procedure, a 17α-dihalocyclopropyl-androst-4-ene, estr-4-ene, estr-5(10)-ene or $\Delta^{1,3,5(10)}$-estratriene is reacted with a molar excess, preferably about 2 to 10 molar equivalents of an alkyl lithium such as butyl lithium. The reaction is carried out in an inert reaction medium such as dioxane, tetrahydrofuran, hexane, and the like, at a temperature of from —40° C. to 0° C., for about one to 24 hours or more, preferably at —30° C. for about one hour.

Alternatively, the 17α-propadienyl starting compounds can be obtained in accordance with our copending patent application Ser. No. 817,562 filed Apr. 18, 1969 by treatment of the corresponding 17α-(3-halopropynyl)-steroid, wherein the halo is chloro, bromo or fluoro with a reagent selected from the group consisting of metals having an oxidation potential between +3.045 and +0.74 volts inclusive, and salts which on ionization generates cations having an oxidation potential between +0.61 and +0.255 volts, inclusive. The reaction is conducted using from 1.5 to 20 moles of the metal or metal salt reagent per mole of starting steroid, in a suitable organic solvent and in the presence of a proton donor, at a temperature ranging from about 20° C. to about 120° C.

The foregoing can be practiced upon starting compounds which bear the 6,6-difluoro grouping. In practice, the 6,6-difluoro grouping is introduced into the precursor androst-4-ene-3,17-diones and 19-norandrost-4-ene-3,17-diones or 18-alkyl derivatives thereof. One method by which this is done is described in U.S. Pat. 3,219,673. This method involves treating a 3-acyloxy-5-fluoro-6-keto steroid (which are known or can be prepared as described in the cited patent and its references) with sulfur tetrafluoride to prepare the corresponding 3-acyloxy-5,6,6-trifluoro steroid which is hydrolyzed to the 3-hydroxy-5,6,6-trifluoro compound. The latter compound is oxidized to the corresponding 3-keto-5,6,6-trifluoro derivative which is then treated with a dehydrofluorinating agent such as alumina to provide the 3-keto-$\Delta^4$-6,6-difluoro compound.

Another method by which these 6,6-difluoro steroids are prepared involves twice consecutively forming an enol ether and treating this with perchloryl fluoride. Thus, the starting androst-4-ene-3,17-dione is converted to its enol ether and it is treated with perchloryl fluoride to form the 3-keto-$\Delta^4$-6-fluoro derivative. The same procedure is followed with this compound to form the 3-keto-$\Delta^4$-6,6-difluoro products.

The iodomethyl metal iodide reagent is obtained by treatment of methylene iodide with a couple of a metal of the type previously mentioned with another metal having an oxidation potential between approximately —0.3 and —1.7 v., such as copper, mercury, silver, palladium, etc., in a solvent of the type used for the reaction, and preferably at reflux temperature from about 1 to 4 hours and if desired, in the presence of catalytic amounts of iodine. Examples of metal couples which are suitable and may be prepared by conventional methods known to the one skilled in the art are zinc-copper, zinc palladium, zinc-silver, chromium-copper, chromium-palladium and the like. The preferred metal couple is the zinc-copper couple.

An excess of the iodomethyl zinc iodide reagent, of between 1.5 to 5 molar equivalents, and particularly from 2 to 3 molar equivalents per mol of starting allene is generally used.

The reaction is preferably carried out in diethyl ether as solvent, in the presence of a small amount of another ethereal organic solvent such as dimethoxyethane, under substantially anhydrous conditions at the boiling point of the reaction mixture. It is convenient to evaporate initially a fraction of the reaction mixture which may be comprised between 10 and 90% of the initial volume of said mixture, to thus eliminate the methyl iodide formed during the reaction, adding periodically additional amounts of ether to maintain the volume of the reaction mixture essentially constant. Once the methyl iodide has been eliminated, the reaction is continued under refluxing conditions for a period of time of between 3 and 72 hours. Alternatively, there can be used other ether solvents, such as tetrahydrofuran, dioxane, dimethoxyethane, diglyme (diethyleneglycol dimethylether), triglyme (triethyleneglycol dimethylether) and the like, heating the reaction mixture at temperatures comprised between 40 and 75° C. for a period of time of between 3 and 72 hours.

The isolation of the resulting compounds may be carried out by conventional methods, for example by pouring the reaction mixture into iced ammonium chloride solution, followed by separation of the organic phase when feasible, extraction of the aqueous phase with an organic solvent non miscible with water, evaporation of the solvent and separation of the methylenecyclopropyl and spiropentyl compounds by conventional techniques such as chromatography or fractional crystallization.

The 17α-methylenecyclopropyl and 17α - spiropentyl 17β-hydroxy compounds of this invention may be converted into the corresponding 17β-acyloxy-, 17β-(tetrahydropyran-2'-yloxy), 17β - (tetrahydrofuran-2'-yloxy) or 17β-(4'-methoxytetrahydropyran-4'-yloxy) derivatives by conventional methods. Thus, by reaction with an appropriate carboxylic acid anhydride solution or in mixture with the corresponding carboxylic acid, and in the presence of an acid catalyst such as p-toluenesulfonic acid, the corresponding 17β-acyloxy derivatives are produced. Similarly, treatment of the 17β-hydroxy compounds with dihydropyran, dihydrofuran, or 4-methoxy-5,6-dihydro-2H-pyran in the presence of an acid catalyst such as p-toluenesulfonic acid, p-toluenesulfonyl chloride and the like, affords the 17β-tetrahydropyran-2'-yloxy and 17β-tetrahydrofuran-2'-yloxy compounds.

Preferably after the principal reaction hereof, the 3-keto group of the $\Delta^4$-3-keto-androstane and estrene compounds of the present invention can be reduced with a double metal hydride such as lithium aluminum hydride, lithium tri-t-butoxy aluminum hydride or the like, and the resulting 3β-hydroxy steroid can then be esterified with carboxylic acid anhydrides in pyridine solution to give the 3-monoesters, or in benzene solution in the presence of an acid catalyst, as described hereinbefore, to afford the 3,17-diacyloxy compounds. If a mixed diester is desired, the 3-hydroxyl group is first esterified by the carboxylic anhydride-pyridine method, esterifying later the 17β-hydroxyl group with a different carboxylic anhydride in the presence of an acid catalyst.

The 3β,17β-diol can be alternatively etherified with dihydropyran, dihydrofuran, or 4-methoxy-5,6-dihydro-2H-pyran in the presence of an acid catalyst, as previously mentioned, to produce the diethers.

The following preparation and examples further illustrate the process of the invention, but are not intended to limit its scope.

PREPARATION OF IODO METHYL-ZINC-IODIDE

A mixture of 2 g. of cupric acetate and 20 ml. of acetic acid is boiled for 5 minutes. The resulting solution is decanted from undissolved cupric acetate and added, in a one minute period, to a well stirred homogeneous suspension of 15 g. (0.23 g. atoms) of zinc powder in 15 ml. of cold acetic acid. The zinc-copper couple thus obtained is separated by filtration, washed once with 20 ml. of acetic acid and then with dry ether until the odor of acetic acid is eliminated, taking care that the couple does not become completely dry.

The wet zinc-copper couple is then transferred to a 100 ml. three-necked flask filled with a reflux condenser and an addition funnel to which thereafter are added 20 ml. of anhydrous ether and a crystal of iodine. When the color of iodine disappears, there is added 10 g. of methylene iodide; within a few minutes the reaction boils spontaneously. Then is added dropwise a mixture of 25 g. more of methylene iodide and 50 ml. of anhydrous ether, within a 30 minute period. The reaction mixture is allowed to reflux spontaneously for 1 hour and heated to reflux for an additional hour. It is then cooled in ice and filtered in a closed system. The volume of the filtrate, which contains the iodomethyl zinc iodide reagent is brought to 80 ml. by the addition of ether.

EXAMPLE 1

To a solution of 1.8 g. of 17α-propadienylestr-4-en-17β-ol-3-one in 40 ml. of dry ether is added 5 ml. of anhydrous dimethoxyethane, and the resulting mixture is then treated dropwise in a one hour period with the iodomethyl zinc-iodide reagent recently prepared (from 11 g. of zinc-copper couple, 25 g. of methylene iodide and 70 ml. of ether), while ether is distilled from the reaction mixture at such a rate that the total volume of the reaction mixture remains constant. The distillation of ether is continued after completion of the addition of the reagent until virtually all the ether is distilled off. Seventy milliliters of fresh ether is added and the distillation is continued for 1 hour more, the volume of the reaction mixture being kept constant by continuous addition of fresh ether. The reaction mixture is then refluxed for 3 hours, cooled in ice and poured into 10% aqueous ammonium chloride solution. The organic layer is separated and the aqueous layer extracted several times with ether. The combined organic extracts are dried over sodium sulfate and evaporated to dryness under reduced pressure. The residue is chromatographed on 100 g. of Florisil. The fraction eluted with ether-hexane 2:1 and ether which contain the desired products, are further purified by thin layer chromatography in a hexane-ethyl acetate (2:1) system, thus producing 17α-(1',2'-methyleneprop-2'-en-1'-yl)-estr-4-en-17β-ol-3-one which is crystallized from ether-pentane and the less polar product, 17α-spiropentylestr-4-en-17β-ol-3-one.

In a similar manner, starting from

17α-propadienylandrost-4-en-17β-ol-3-one,
17α-propadienylestr-5(10)-en-17β-ol-3-one,
6,6-difluoro-17α-propadienylandrost-4-en-17β-ol-3-one,
6,6-difluoro-17α-propadienyl-18-methylandrost-4-en-17β-ol-3-one,
17α-propadienyl-18-ethylandrost-4-en-17β-ol-3-one,
17α-propadienyl-18-ethylestr-4-en-17β-ol-3-one,
17α-propadienyl-18-methylestr-4-en-17β-ol-3-one, and
17α-(1'-methylpropadienyl)-estr-4-en-17β-ol-3-one, the following compounds are respectively obtained:

17α-(1',2'-methyleneprop-2'-en-1'-yl)-androst-4-en-17β-ol-3-one, and
17α-spiropentylandrost-4-en-17β-ol-3-one,
17α-(1'-2'-methyleneprop-2'-en-1'-yl)-estr-5(10)-en-17β-ol-3-one, and
17α-spiropentylestr-5(10)-en-17β-ol-3-one,
6,6-difluoro-17α-(1',2'-methyleneprop-2'-en-1'-yl)-androst-4-en-17β-ol-3-one, and
6,6-difluoro-17α-spiropentylandrost-4-en-17β-ol-3-one,
6,6-difluoro-17α-(1',2'-methyleneprop-2'-en-1'-yl)-18-methylandrost-4-en-17β-ol-3-one, and
6,6-difluoro-17α-spiropentyl-18-methylandrost-4-en-17β-ol-3-one,
17α-(1',2'-methyleneprop-2'-en-1'-yl)-18-ethylandrost-4-en-17β-ol-3-one, and
17α-spiropentyl-18-ethylandrost-4-en-17β-ol-3-one,
17α-(1',2'-methyleneprop-2'-en-1'-yl)-18-ethylestr-4-en-17β-ol-3-one, and
17α-spiropentyl-18-ethylestr-4-en-17β-ol-3-one,
17α-(1',2'-methyleneprop-2'-en-1'-yl)-18-methylestr-4-en-17β-ol-3-one, and
17α-spiropentyl-18-methylestr-4-en-17β-ol-3-one,
17α-(1'-methyl-1',2'-methyleneprop-2'-en-1'-yl)-estr-4-en-17β-ol-3-one and 17α-(1'-methylspiropentyl)-estr-4-en-17β-ol-3-one.

EXAMPLE 2

To the iodo methyl zinc iodide reagent prepared in accordance with the above-described preparation is added 5 ml. of anhydrous dimethoxyethane, whereupon a white precipitate is formed. The resulting suspension is added dropwise, in a one hour period, to a solution of 1.6 g. of 17α-propadienyl - 3 - methoxyesta - 1,3,5(10) - trien-17β-ol in 30 ml. of dry ether, while approximately 40 ml. of ether are distilled from the reaction mixture. The total volume of the reaction mixture at the end of the addition is approximately 70 ml. The distillation of ether is continued for half an hour more, the volume of the reaction mixture being kept constant by continuous addition of fresh ether. The reaction mixture is then refluxed for 48 hours, cooled and poured into 10% aqueous ammonium chloride solution. The organic layer is separated and the aqueous layer extracted several times with ether. The combined organic extracts are dried over sodium sulfate and evaporated to dryness. The oily residue is chromatographed on 100 g. of Florisil. The fractions eluted with hexane-ether (90:10) are combined, evaporated to dryness and further purified by thin layer chromatography in hexane-ethyl acetate 4:1 to give 17α-(1',2'-methyleneprop-2'-en-1'-yl) - 3 - methoxyestr-1,3,5(10)-trien-17β-ol, which is recrystallized from hexane, and the less polar product, 17α - spiropentyl-3-methoxy-estr-1,3,5(10)-trien-17β-ol.

EXAMPLE 3

In accordance with the methods described in Examples 1 or 2, 17α-propadienylestra-1,3,5(10)-triene-3,17β-diol, 3-methoxy-17α-(1'-methylpropadien-1'-yl) - 18 - methylestra-1,3,5(10)-trien-17β-ol and 3-acetoxy-17α-propadienyl-18-methylestra-1,3,5(10)-trien-17β-ol are converted respectively into 17α-(1',2'-methyleneprop-2'-en-1'-yl)-estra-1,3,5(10)-triene-3,17β-diol and 17α spiropentylestra-1,3,5(10)-triene-3,17β-diol, 3-methoxy-17α-(1'-methyl-1',2'-methyleneprop - 2' - en-1'-yl)-18-methylestra-1,3,5(10)-trien-17β-ol and 3-methoxy-17α-(1'-methylspiropentyl)-18-methylestra-1,3,5(10)-trien-17β-ol, and 3-acetoxy-17α-(1',2'-methyleneprop-2'-en-1'-yl) - 18 - methylestra - 1,3,5(10)-trien-17β-ol and 17α-spiropentyl-18-methylestra-1,3,5(10)-trien-17β-ol.

EXAMPLE 4

Twenty ml. of acetic anhydride and 2 g. of calcium hydride are refluxed for 2 hours, and benzene is then added to bring the boiling point down to 125° C. After this time, 2 g. of 17α-(1',2'-methyleneprop-2'-en-1'-yl)-estr-4-en-17β-ol-3-one are added and the resultant mixture refluxed for 16 hours. The mixture is then allowed to stand in ice. The mixture is filtered and the residue crystallized from methylene chloride:methanol to afford the pure 17β-acetoxy-17α-(1',2'-methyleneprop - 2' - en-1'-yl)-estr-4-en-3-one.

By the same method, but using propionic, undecenoic and cyclopentylpropionic anhydride in lieu of acetic anhydride, the corresponding 17β-propionates, 17β-undecenoates and 17β-cyclopentylpropionates of 17α-(1',2'-methyleneprop-2'-en-1'-yl) - androst - 4 - en - 17β-ol-3-one, 17α-(1',2'-methyleneprop-2'-en-1'-yl) - 18 - methylestr-4-en-17β-ol-3-one and 17α-spiropentylestr-4-en-17β-ol-3-one are obtained.

EXAMPLE 5

A solution of 1 g. of 17α-(1',2'-methyleneprop-2'-en-1'-yl)-estr-4-en-17β-ol-3-one in 50 ml. of anhydrous tetrahydrofuran is added over a 30 minute period to a stirred suspension of 1 g. of lithium aluminum hydride in 50 ml. of anhydrous tetrahydrofuran and this mixture is heated at reflux for 2 hours. To the mixture is added 5 ml. of ethyl acetate and 2 ml. of water. Sodium sulfate is next added, the mixture filtered and the solid thus collected is washed with hot ethyl acetate. The combined organic solutions are then evaporated to yield 17α-(1',2'-methyleneprop-2'-en-1'-yl)-estr-4-ene-3β,17β-diol, which is further purified through recrystallization from acetone-hexane.

Use of this procedure with the other 3-keto-17β-hydroxy compounds described above will similarly yield the 3β,17β-diol derivatives, e.g. 17α-(1',2'-methyleneprop-2'-en-1'-yl)-18-methylestr-4-ene-3β,17β-diol, 17α-(1',2'-methyleneprop-2'-en-1'-yl) - androst - 4 - ene - 3β,17β - diol, 17α-spiropentylestr-4-ene-3β,17β-diol and 17α-spiropentylandrost-4-ene-3β,17β-diol.

EXAMPLE 6

To a solution of 1 g. of 17α-(1',2'-methyleneprop-2'-en-1'-yl)-estr-4-en-3β,17β-diol in 4 ml. of pyridine is added 4 ml. of acetic anhydride and the mixture allowed to stand for 5 hours. At the end of this time, the reaction mixture is precipitated with water and the precipitate filtered off and dried. The solid product, 3β-acetoxy-17α-(1',2'-methylene-prop-2'-en-1'-yl) - estr - 4 - en - 17β - ol, is then recrystallized from acetone-hexane.

By using propionic, caproic and cyclopentylpropionic anhydride instead of acetic anhydride, the corresponding 3 - monoesters of 17α - (1',2'-methyleneprop-2'-en-1'-yl)-estr-4-en-3β,17β-diol are obtained.

Similarly, 17α-spiropentylandrost-4-en-3β,17β-diol is converted into the corresponding 3-monoacetate, 3-monopropionate, 3-monocaproate and 3-monocyclopentylpropionate.

EXAMPLE 7

Two milliliters of dihydropyran is added to a solution of 1 g. of 17β-hydroxy-17α-(1',2'-methyleneprop-2'-en-1'-yl)-estr-4-en-3-one in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane to yield 17β-(tetrahydropyran-2'-yloxy)-17α-(1',2'-methyleneprop-2'-en-1'-yl)-estr-4-en-3-one which is recrystallized from pentane.

Similarly, following the above procedure, other 17β-hydroxy-17α-methylenecyclopropyl and 17α-spiropentyl compounds are converted into the corresponding 17β-(tetrahydropyran-2'-yloxy)-derivatives, e.g. 17β-(tetrahydropyran-2'-yloxy) - 17α - (1',2'-methyleneprop-2'-en-1'-yl)-18-methylestr-4-en-3-one, 17β - (tetrahydropyran-2'-yloxy) - 17α - spiropentylestr-4-en-3-one, 17β-(tetrahydropyran-2'-yloxy) - 17α - (1',2'-methyleneprop-2'-en-1'-yl)-androst-4-en-3-one and the like.

By using dihydrofuran and 4-methoxy-5,6-dihydro-2H-pyran in place of dihydropyran in the above described procedure, the corresponding 17β-(tetrahydrofuran-2'-yloxy) and 17β-(4'-methoxytetrahydropyran-4'-yloxy) derivatives are obtained.

EXAMPLE 8

In accordance with the process described in Example 7 but using 4 ml. of dihydropyran, 1 g. of 17α-(1',2'-methylene-prop-2'-en-1'-yl)-estr-4-ene-3β,17β-diol is converted into 3β,17β - bistetrahydropyranyloxy-17α-(1',2'-methyleneprop-2'-en-1'-yl)-estr-4-ene.

In a similar manner, 17α-(1',2'-methyleneprop-2'-en-1'-yl)-estra-1,3,5(10)-triene-3,17β-diol affords 3,17β-bistetrahydropyranyloxy-17α-(1',2'-methyleneprop-2'-en-1' - yl)-estra-1,3,5(10)-triene.

EXAMPLE 9

By following the method of Example 4 the 3-monoacyloxy compounds obtained in Example 6 are converted into the 3,17β-diacyloxy derivatives. Thus, for example, starting from 3β-acetoxy-17α-(1',2'-methyleneprop-2'-en-1'-yl)-estr-4-en-17β-ol and using acetic and propionic anhydrides as esterifying agents 3β,17β-diacetoxy-17α-(1',2'-methyleneprop-2'-en-1'-yl) - estr - 4 - ene and 3β-acetoxy-17β-propionoxy-17α-(1',2'-methyleneprop-2' - en - 1' - yl)-estr-4-ene, respectively, are obtained.

In accordance with the methods hereof, the following compounds are prepared:

6,6-difluoro-17α-(1',2'-methyleneprop-2' - en - 1' - yl)-androst-4-en-17β-ol-3-one,
6,6-difluoro-17α-spiropentylandrost-4-en-17β-ol-3-one,
6,6-difluoro-17α-(1',2'-methyleneprop-2'-en-1'-yl)-17β-acetoxyandrost-4-en-3-one,
6,6-difluoro-17α-spiropentyl-17β-acetoxyandrost-4-en-3-one,
6,6-difluoro-17α-(1',2'-methyleneprop-2'-en-1'-yl)-18-methylandrost-4-en-17β-ol-3-one, 6,6-difluoro-17α-spiropentyl-18-methylandrost-4-en-17β-ol-3-one,
6,6-difluoro-17α-(1',2'-methyleneprop-2'-en-1'-yl)-17β-acetoxy-18-methylandrost-4-en-3-one,
6,6-difluoro-17α-spiropentyl-17β-acetoxy-18-methylandrost-4-en-3-one,
6,6-difluoro-17α-(1',2'-methyleneprop-2'-en-1'-yl)-estr-4-en-17β-ol-3-one,
6,6-difluoro-17α-spiropentylestr-4-en-17β-ol-3-one,
6,6-difluoro-17α-(1',2'-methyleneprop-2'-en-1'-yl)-17β-acetoxyestr-4-en-3-one,
6,6-difluoro-17α-spiropentyl-17β-acetoxyestr-4-en-3-one,
6,6-difluoro-17α-(1',2'-methyleneprop-2'-en-1'-yl)-18-methylestr-4-en-17β-ol-3-one,
6,6-difluoro-17α-spiropentyl-18-methylestr-4-en-17β-ol-3-one,
6,6-difluoro-17α-(1',2'-methyleneprop-2'-en-1'-yl)-17β-acetoxy-18-methylestr-4-en-3-one,
6,6-difluoro-17α-spiropentyl-17β-acetoxy-18-methylestr-4-en-3-one,
17α-(1',2'-methyleneprop-2'-en-1'-yl)-18-methylestr-5(10)-en-17β-ol-3-one,
17α-spiropentyl-18-methylestr-5(100)-en-17β-ol-3-one,
17α-(1',2'-methyleneprop-2'-en-1'-yl)-17β-acetoxy-18-methylestr-5(10)-en-3-one,
17α-spiropentyl-17β-acetoxy-18-methylestr-5(10)-en-3-one,
17α-spiropentyl-18-methylestr-4-en-17β-ol-3-one,
17α-(1',2'-methyleneprop-2'-en-1'-yl)-17β-acetoxy-18-methylestr-4-en-3-one,
17α-spiropentyl-17β-acetoxy-18-methylestr-4-en-3-one,
17α-(1',2'-methyleneprop-2'-en-1'-yl)-17β-acetoxy-18-methylestra-1,3,5(10)-trien-3-one,
17α-spiropentyl-17β-acetoxy-18-methylestra-1,3,5(10)-trien-3-one.

What is claimed is:
1. A compound selected from the group of compounds represented by the formulas:

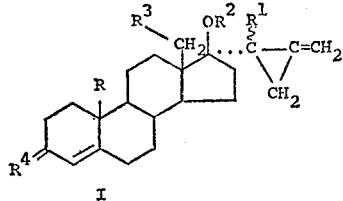
I
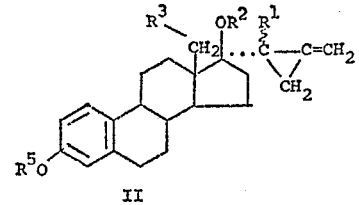
II

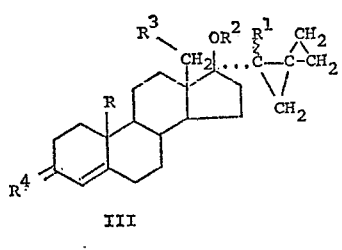
III
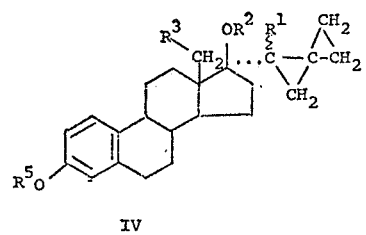
IV

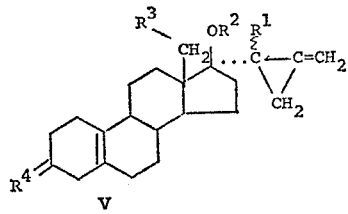
V
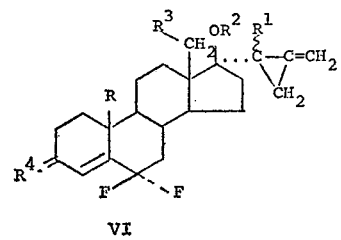
VI

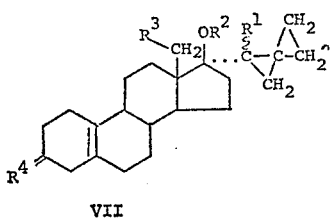
VII
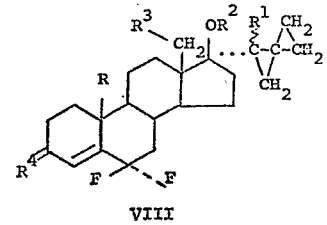
VIII wherein
R is hydrogen or methyl;
$R^1$ is hydrogen, methyl or ethyl;
$R^2$ is hydrogen, tetrahydrofuran-2-yl, tetrahydropyran-2-yl, 4-methoxytetrahydropyran-4-yl or a carboxylic acyl group containing less than 12 carbon atoms;
$R^3$ is hydrogen or a lower alkyl group of 1 to 3 carbon atoms, inclusive;
$R^4$ is a keto group or the group

in which $R^6$ is hydrogen, tetrahydrofuran-2-yl, tetrahydropyran-2-yl, 4-methoxytetrahydropyran-4-yl, or a carboxylic acyl group containing less than 12 carbon atoms; and
$R^5$ is hydrogen, lower alkyl of 1 to 8 carbon atoms inclusive, cycloalkyl, tetrahydrofuran-2-yl, tetrahydropyran-2-yl, 4-methoxytetrahydropyran-4-yl, or a carboxylic acyl group containing less than 12 carbon atoms.

2. The compound of claim 1, Formula I wherein each of R, $R^1$, $R^2$, and $R^3$ is hydrogen and $R^4$ is keto.

3. The compound of claim 1, Formula II wherein each of $R^1$, $R^2$ and $R^3$ is hydrogen and $R^5$ is methyl.

4. The compound of claim 1, Formula III wherein each of R, $R^1$, $R^2$ and $R^3$ is hydrogen, and $R^4$ is keto.

5. The compound of claim 1, Formula IV wherein each of $R^1$, $R^2$, and $R^3$ is hydrogen and $R^5$ is methyl.

6. The compound of claim 1, Formula V wherein each of $R^1$, $R^2$, and $R^3$ is hydrogen and $R^4$ is keto.

7. The compound of claim 1, Formula VII wherein each of $R^1$, $R^2$, and $R^3$ is hydrogen and $R^4$ is keto.

8. The compound of claim 1, Formula VI wherein $R^1$ is hydrogen and $R^4$ is keto.

9. The compound of claim 8 wherein $R^2$ is hydroxy and $R^3$ is hydrogen.

10. The compound of claim 8 wherein $R^2$ is hydroxy and $R^3$ is methyl.

11. The compound of claim 8 wherein $R^2$ is acetoxy and $R^3$ is hydrogen.

12. The compound of claim 8 wherein $R^2$ is acetoxy

13. A compound of claim 1, Formula VIII wherein

13. A compound of claim 1, Formula VIII wherein $R^1$ is hydrogen and $R^4$ is keto.

14. A compound of claim 13 wherein $R^2$ is hydroxy and $R^3$ is hydrogen.

15. A compound of claim 13 wherein $R^2$ is hydroxy and $R^3$ is methyl.

16. A compound of claim 13 wherein $R^2$ is acetoxy and $R^3$ is hydrogen.

17. A compound of claim 13 wherein $R^2$ is acetoxy and $R^3$ is methyl.

18. A process for producing 17α-methylenecyclopropyl and 17α-spiropentyl-17β-hydroxy steroids of the androstane, estrane and estrogen series, which comprises treating the corresponding 17α-propadienyl steroid with an iodomethyl metal iodide, wherein the metal has an oxidation potential of between +0.25 v. and +1.18 v. in the absence of alkyl iodides, in an ether solvent.

19. The process of claim 18 wherein the iodomethyl metal iodide is iodomethyl zinc iodide.

References Cited

UNITED STATES PATENTS 3,392,165  7/1968  Edwards et al. ____ 260—239.55
3,478,019  11/1969  Edwards _____ 260—239.55

ELBERT L. ROBERTS, Primary Examiner

U.S. Cl. X.R.

260—239.55, 397.45, 397.5